July 20, 1948.  R. B. DAVIS  2,445,606
ARTICLE HOLDER
Filed Oct. 9, 1947
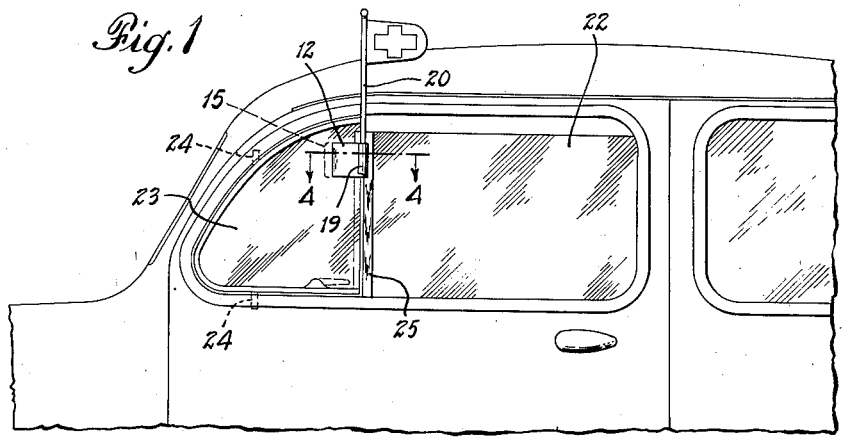
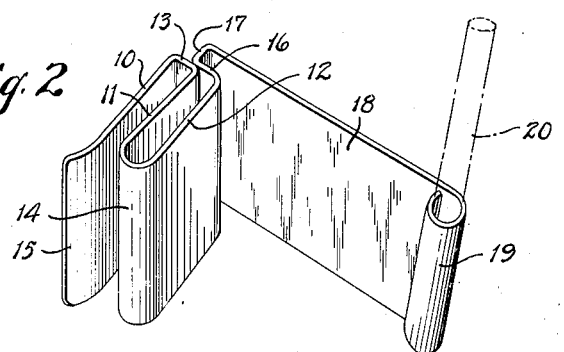
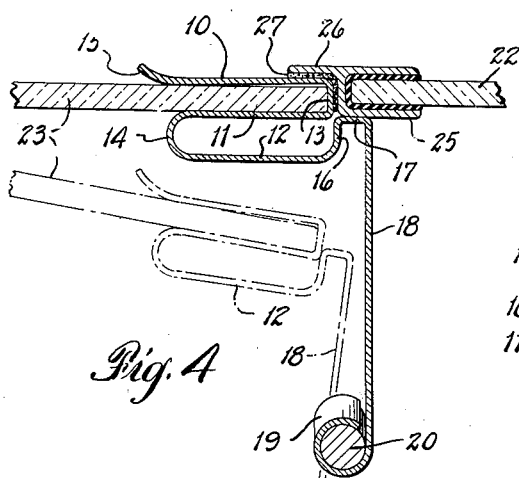
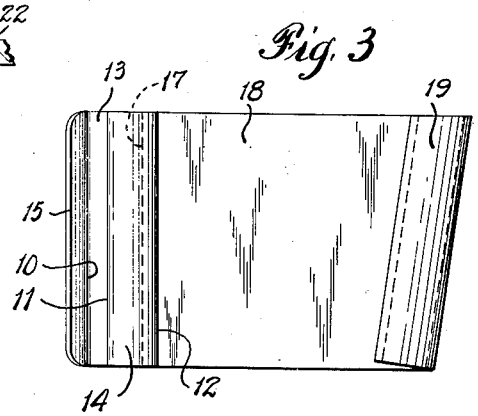
INVENTOR.
R. Bernard Davis
BY
Morgan, Finnegan & Durham
ATTORNEYS.

Patented July 20, 1948

2,445,606

UNITED STATES PATENT OFFICE 2,445,606

ARTICLE HOLDER

Ralph Bernard Davis, Okmulgee, Okla.

Application October 9, 1947, Serial No. 778,979

5 Claims. (Cl. 248—226)

The present invention relates to an article support or holder and more particularly to a holder for a flag staff or similar article.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Fig. 1 is a side elevation of a typical and illustrative embodiment of the invention shown in place on the front wing window of an automobile and holding a flag staff;

Fig. 2 is a perspective view of the flag staff holder shown in Fig. 1;

Fig. 3 is a side elevation of the flag staff holder as viewed from the side showing in Fig. 1 of the drawings; and, Fig. 4 is a cross-sectional view taken along line 4—4 of Fig. 1.

The present invention has for an object the provision of a holder for carrying a flag staff or similar article and supporting the same upon a vehicle window or the like. The holder is particularly adapted to use with vehicle windows wherein the window is made in sections, a main section being mounted for vertical operation and a smaller or wing section being mounted for pivotal movement about a substantially vertical axis. Another object is the provision of a holder which is simple and sturdy in construction, which securely supports the flag staff or similar article, and which may be securely mounted on a vehicle window or the like without damage thereto. Still another object is the provision of a holder which is easily and removably mounted on a vehicle and which, when mounted on the wing section of a sectional vehicle window, is even more securely positioned when the wing section is closed.

Referring now in detail to the illustrative embodiment of the invention shown by way of example in the accompanying drawings, and referring first to Fig. 2, the holder comprises a single rectangular piece of resilient material as, for instance, stainless steel, bent into the configuration shown. When so bent the holder comprises three spaced and adjacently extending reaches of material 10, 11, and 12 formed by giving a generally S configuration to a substantial portion of the length of the original blank of material. The reach 10 is thus the portion of the original blank at one end thereof, the reach 11 is a further portion of the original length doubled back along reach 10, and reach 12 is the next consecutive portion of the length of the original blank which is again reversely curved back along reach 12.

The reaches 10 and 11 are preferably joined by a relatively plane or flat, short reach 13 of material for reasons which will hereinafter appear, and the reaches 11 and 12 may conveniently be joined by a smoothly curved reach 14. The reaches 10 and 11 are preferably formed so that they lie in planes following a converging course toward the open or separated ends of the reaches, so that when the holder is supported on a glass pane or similar thin, flat object, and said object positioned in the space between the reaches, a force fit is provided and spring tension utilized to keep the holder in place. The end 15 of reach 10 is somewhat curved away from adjacent reach 11, and may extend outwardly beyond the adjacent end of reach 11, that is, at curved reach 14. There is thus provided a widened mouth and curved guiding surface enabling the holder to be easily forced over and embrace the flat object upon which it is supported.

At its end opposite the short curved reach 14, the reach 12 is smoothly turned into a short reach of material 16 which extends preferably at about righ angles to the planes of the reaches 10, 11 and 12. The short reach 16 is preferably substantially plane toward its end adjacent short reach 13, and is positioned to lie closely adjacent to and slightly overlap said reach 13 when the holder is dismounted and in an unstressed condition, as shown. The reach 16 merges at a substantially right angle bend into a short substantially plane reach 17, which in turn merges by an abrupt, substantially right angled bend into the relatively long reach 18 of the holder, which serves as an arm for the support of a flag staff or similar article.

The end of reach 18 is turned to form a holding portion 19 for an article such as, for instance, a flag staff 20 indicated by broken lines in Fig. 1. In case the holder is to be used with a cylindrical object as in the illustrative embodiment of the invention shown, the portion 19 is turned to embrace such an object being given, however, a slightly frusto-conical form with a diminishing diameter toward the bottom so that the cylindrical object may be wedged in place for greater security. The holding portion 19 may, if desired, have its axis slightly inclined to the vertical, as shown in Fig. 3, so that a flag upported therein inclines outwardly from the side of a vehicle for clearer observation.

The holder of the present invention is particularly useful in supporting a flag staff from an automobile, and is specially adapted to use with vehicles having sectional windows. As shown in Fig. 1, a conventional type of automobile window comprises a rear main window section 22 which opens and closes in vertical movement, and a forward, ventilating, or wing window section 23, which operates about a substantially vertical axis on pivots in the door frame, as indicated at 24. The holder of the invention may be positioned so as to embrace the rear vertical edge of the ventilating section 23 between the reaches 10 and 11 of the holder.

As thus positioned, the holder is securely supported by the tension of the resilient reaches 10 and 11 which have been spread to accommodate the window section, as earlier described. The holder is shown in position upon the window section 23 in the broken line position in Fig. 4 of the drawings, with the section opened and the holder held outwardly from the main window section 22. When the ventilating section 23 is now closed by movement about pivots 24, the holder is moved to abut main window section 22 and is held even more securely in place. As shown in the solid line position in Fig. 4, a molding 25 is usually provided along the forward edge of the main window section having a flange portion 26 covered with a sealing strip 27 of sponge rubber, felt, or the like against which the ventilating window abuts. The short reach 13 fits without interference between the edges of the window sections, and the short reach 17 abuts the molding 25 of the main window section 22 before closing is completed. When the windows have been brought to completely closed position, reach 16 has been moved out of overlapping relationship with respect to reach 13, and reaches 11 and 12 additionally tensioned. The result is that a firm seating of the holder takes place upon both of the automobile window sections, and each of the reaches 10, 11 and 12 is placed under tension to firmly grip the window between reaches 10 and 11.

The invention in its broader aspects is not limited to the specific mechanisms shown and described but departures may be made therefrom, within the scope of the accompanying claims, without departing from the principles of the invention and without sacrificing its chief advantages.

What I claim is:

1. A holder of the type described comprising a pair of spaced, overlapping reaches and a third reach between said reaches and resiliently connected at either end to a respective one of said first reaches, a flat short reach being at the interconnection of two of said reaches, another flat short reach connected to one of said pair of reaches adjacent said first flat short reach and substantially perpendicular thereto, and means connected to said second flat short reach for holding an object.

2. A holder of the type described comprising a length of resilient material bent to provide three spaced, interconnected reaches the interconnection of two being a short, flat reach, a second short, flat reach connected to the other of said three reaches being normally adjacent said first short, flat reach and substantially perpendicular thereto, and a relatively long reach connected to said second short, flat reach and adapted to hold an object.

3. A holder of the type described comprising an element of generally S configuration having three main reaches whereof are resiliently interconnected two of said three main reaches thereof being interconnected by a relatively short, straight reach of material positioned substantially perpendicularly to said two reaches, means for supporting an object, and a second relatively short, straight reach of material interconnecting said element and supporting means, said fourth reach being positioned substantially perpendicularly to said first straight reach and normally in intersecting relationship therewith being displaceable out of said intersecting relationship.

4. A holder of the type described comprising a single rectangular piece of resilient material bent to form at least three spaced, overlapping main reaches two of said reaches being joined by a relatively short, straight reach, and being further bent to provide a second relatively short straight reach substantially perpendicular to said first short reach and normally positioned in an intersecting relationship therewith being displaceable out of said intersecting relationship, and a relatively long supporting reach adapted to support an object, said second short reach interconnecting said supporting reach and one of said main reaches.

5. A holder of the type described comprising a single rectangular piece of resilient material bent to form at least three spaced, overlapping main reaches two of said reaches being joined by a relatively short, straight reach, and being further bent to provide a second relatively short straight reach substantially parallel to said first short reach and adjacent thereto and a third relatively short straight reach substantially perpendicular to said first and second short reaches and normally positioned in an intersecting relationship with respect to said first short reach being displaceable out of said intersecting relationship, and a supporting reach connected to said third short reach adapted to support an object.

R. BERNARD DAVIS.

REFERENCES CITED

The following references are of record in the file of this patent:

UNITED STATES PATENTS

| Number | Name | Date |
|---|---|---|
| 926,798 | Wilson | July 6, 1909 |
| 1,707,557 | Leap | Apr. 2, 1929 |
| 1,743,694 | Tierney | Jan. 14, 1930 |
| 1,744,196 | Ames | Jan. 21, 1930 |
| 2,071,155 | Alexander | Feb. 16, 1937 |